(12) United States Patent
Cui

(10) Patent No.: US 12,280,782 B2
(45) Date of Patent: Apr. 22, 2025

(54) ROUNDABOUT CHARACTERISTICS RECOGNITION SYSTEM

(71) Applicant: Chongqing Changan Automobile Company Limited, Chongqing (CN)

(72) Inventor: Dehua Cui, Northville, MI (US)

(73) Assignee: Chongqing Changan Automobile Company Limited, Chongqing (CN)

( * ) Notice: Subject to any disclaimer, the term of this patent is extended or adjusted under 35 U.S.C. 154(b) by 378 days.

(21) Appl. No.: 17/974,570

(22) Filed: Oct. 27, 2022

(65) Prior Publication Data

US 2024/0140430 A1    May 2, 2024

(51) Int. Cl.
*B60W 30/18*    (2012.01)
*B60W 60/00*    (2020.01)

(52) U.S. Cl.
CPC .... *B60W 30/18159* (2020.02); *B60W 60/001* (2020.02); *B60W 2552/00* (2020.02); *B60W 2554/406* (2020.02)

(58) Field of Classification Search
CPC ......... B60W 30/18159; B60W 60/001; B60W 2552/00; B60W 2554/406
See application file for complete search history.

(56) References Cited

PUBLICATIONS

Klupacs, James, et al. "Multiagent information fusion for connected driving: A review." IEEE Access 10 (2022): 85030-85049. (Year: 2022).*

"The fundamental bases of random finite set filters are reviewed with more elaboration on a particular filter called the Labeled Multi-Bernoulli filter." (Year: 2022).*

* cited by examiner

*Primary Examiner* — Alan D Hutchinson
(74) *Attorney, Agent, or Firm* — JCIPRNET

(57) ABSTRACT

A roundabout characteristics recognition system for an autonomous driving vehicle. The roundabout characteristics recognition system detects the various remote object trajectories around the roundabout traffic circle environment and analyzes the trajectories to extract feature data relevant to the roundabout topology and geometry. The roundabout characteristics recognition system processes the remote object trajectories data and determines the statistical characteristics of the various topological characteristics and geometric characteristics for path planning and control to make a more precise decision for operation of the autonomous driving vehicle.

6 Claims, 6 Drawing Sheets

ROUNDABOUT CHARACTERISTICS RECOGNITION SYSTEM

FIELD

The present invention relates to automotive technology, and more particularly to autonomous driving vehicles.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Autonomous driving has become one of the major trends of automotive technology advancement. To operate the vehicles autonomously it is crucial that the autonomous-driving control operating the vehicle possesses sufficient information about the environment on which the vehicle is operating. The on-board sensors of various types equipped on the autonomous driving vehicle provide such information for the autonomous-driving controller. The various types of sensors may include GPS sensor, radar, lidar, camera or ultrasonic transducers. One of the main purposes of these sensors is to identify the road lane path for the vehicle to follow autonomously.

While there are many alternatives of detecting the road lane information for the operation of path planning and control of autonomous driving vehicle, all the detections are subject to measurement and process errors. Therefore, it is always advisable that the detection information is provided to the operation of path planning and control with a confidence level so the path planning and control operation can decide which detection information is more reliable to be used for the decision making, if it is to be selection for consideration at all. However, all these indication of the confidence level is at best subjectively assessed from the provider of each sensing subsystem, lacking any objective measure for a confidence level from one sensor set to be compared with that from the other.

The most popular state-of-the-art technology to provide the autonomous vehicle with the desired path information is to rely on optical sensors such as camera or lidar. These sensors are very effective to detect the lane marks on the road to provide high-accuracy guidance for the autonomous vehicle provided the lane-mark information are accessible where the traffic density is reasonably moderate for the optical sensors to detect the lane marks. While this technology is very much sophisticated yet matured it does have shortcomings, especially in the environment of a roundabout traffic circle.

In a roundabout traffic circle, the curvature of the circular lanes is usually much higher than that of regular roads such as freeway or street pavement. The lane marks are often blocked off into pieces by the remote vehicles in the vicinity of the host vehicle, and the lane information can hardly be received in its holistic way. Moreover, the central island at the middle of the roundabout effectively blocks off a good portion of the lane mark from being detected via optimal means.

Therefore, it is the objective of the present invention to overcome this type of difficulty in detection of road pathways in an environment of a roundabout traffic circle based on information of trajectories from moving objects such as remote vehicles over the various pathways in and about the roundabout traffic circle such as the roundabout circular track, the entrance path of the roundabout and the exit path of the roundabout.

It is also the objective of the present invention to provide an objective measure of the reliability of the roundabout characteristics information to the operation of path planning and control of the autonomous driving vehicle.

Advantageously, utilization of trajectories of moving objects in a roundabout traffic circle environment expands the detection capability beyond what can only detected on the pavement, greatly enhances the capability of roundabout environment pathways detection.

Advantageously, application of statistical principles in processing the detected trajectories of moving objects as disclosed in the present invention provides a more accurate information about the various recognized characteristics of the roundabout traffic circle for the operation of path planning and control of the autonomous driving vehicle.

SUMMARY

A roundabout characteristics recognition system is disclosed, this roundabout-characteristics recognition system includes a plurality of Random Finite Set (RFS) modules. Each of the RFS module receives a feature scope information for data processing and also receives raw information input data to extract the feature characteristics. an object selection module that determines qualified feature data to be processes based on the raw information input data and the feature scope information, The RFS module also includes a cardinality module that determines a feature data size number representing the size of the qualified feature data according to the qualified feature data, a probability module that determines a probability of the feature based on the feature data size number and the qualified feature data, a probability density function module that assesses a probability density function based on the overall probability of possible qualified feature data of various data size determined by the probability module, a multi-object probability density function module that determines a plurality of probability density functions based on the probability density function of a plurality of the qualified feature, and a feature module that determines a plurality of statistical characteristics of the feature.

The roundabout-characteristics recognition system in present disclosure includes the following RFS modules a sensing RFS module which receives raw data from a sensor set and generates processed sensor data, a target RFS module which receives the processed sensor data and generates a plurality of roundabout remote target data, a remote vehicle trajectory RFS module which receives the roundabout remote target data and generates a plurality of remote vehicle trajectory segments data, a roundabout topological RFS module which receives a plurality of roundabout topological relevant data, and generates a plurality of roundabout topological data, and a roundabout geometric RFS module characterized by receiving a plurality of roundabout geometric relevant data and generating a plurality of roundabout geometric data a roundabout geometric RFS module characterized by receiving a plurality of roundabout geometric relevant data and generating a plurality of roundabout geometric data.

An autonomous driving vehicle is disclosed. The autonomous driving vehicle includes a roundabout characteristics recognition system, This roundabout-characteristics recognition system includes a plurality of Random Finite Set (RFS) modules. Each of the RFS module receives a feature scope information for data processing and also receives raw information input data to extract the feature characteristics. an object selection module that determines qualified feature data to be processes based on the raw information input data and the feature scope information, The RFS module in the autonomous driving vehicle also includes a cardinality module that determines a feature data size number representing the size of the qualified feature data according to the qualified feature data, a probability module that determines a probability of the feature based on the feature data size number and the qualified feature data, a probability density function module that assesses a probability density function based on the overall probability of possible qualified feature data of various data size determined by the probability module, a multi-object probability density function module that determines a plurality of probability density functions based on the probability density function of a plurality of the qualified feature, and a feature module that determines a plurality of statistical characteristics of the feature.

The roundabout-characteristics recognition system of the autonomous driving vehicle in the present disclosure includes the following RFS modules a sensing RFS module which receives raw data from a sensor set and generates processed sensor data, a target RFS module which receives the processed sensor data and generates a plurality of roundabout remote target data, a remote vehicle trajectory RFS module which receives the roundabout remote target data and generates a plurality of remote vehicle trajectory segments data, a roundabout topological RFS module which receives a plurality of roundabout topological relevant data, and generates a plurality of roundabout topological data, and a roundabout geometric RFS module characterized by receiving a plurality of roundabout geometric relevant data and generating a plurality of roundabout geometric data a roundabout geometric RFS module characterized by receiving a plurality of roundabout geometric relevant data and generating a plurality of roundabout geometric data.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
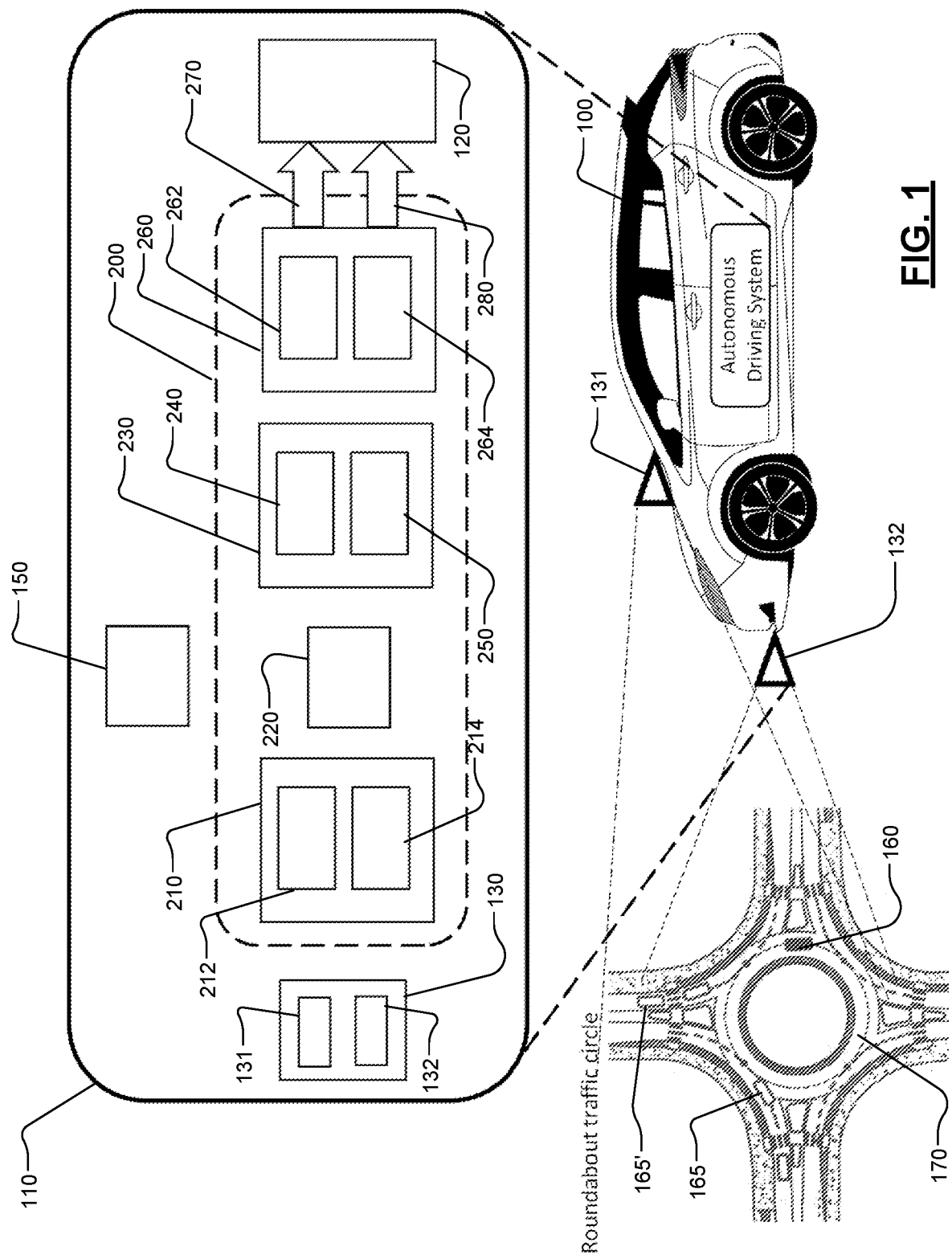
FIG. 1 illustrates an autonomous driving vehicle operating in an environment of a roundabout circular track with a roundabout characteristics recognition system according to the present invention.

The following description is merely exemplary in nature and is in no way intended to limit the disclosure, its application, or uses. For purposes of clarity, the same reference numbers with or without a single or multiple prime symbols appended thereto will be used in the drawings to identify similar elements. As used herein, the phrase at least one of A, B, and C should be construed to mean a logical (A or B or C), using a non-exclusive logical or.

As used herein, the term module may refer to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Nomenclature of the reference numerals in the figures is tabulated below:

| | |
|---|---|
| 100 - autonomous driving vehicle | 110 - autonomous driving system |
| 120 - path planning and control module | 130 - sensor set |
| 131 - radar sensor | 132 - optical sensor |
| 135 - sensor raw data | 140 - roundabout traffic circle |
| 150 - environment feature indication module | 160 - host vehicle |
| 165 - remote vehicle | 170 - roundabout circular track |
| 171 - roundabout entrance path | 172 - roundabout exit path |
| 180 - roundabout central island | 181 - roundabout center |
| 182 - diverging point | 183 - lane radius |
| 184 - roundabout entrance radius | 185 - roundabout exit radius |
| 190 - remote vehicle trajectory | 191 - position vector to the detected divergent point |
| 200 - roundabout characteristics recognition system | 210 - sensing and perception subsystem |
| 212 - sensing RFS module | 213 - processed sensor data |
| 214 - target RFS module | 215 - roundabout remote target data |
| 220 - remote vehicle trajectory RFS module | 225 - remote vehicle trajectory segments data |
| 230 - trajectory signal analysis module | 240 - topological analysis module |
| 245 - roundabout topological relevant data | 250 - geometric analysis module |
| 255 - roundabout geometric relevant data | 260 - roundabout characteristic recognition module |
| 262 - roundabout topological RFS module | 264 - roundabout geometric RFS module |
| 270 - roundabout topological data | 280 - roundabout geometric data |
| 300 - RFS module | 301 - raw information input data |
| 302 - feature scope information | 310 - object selection module |
| 320 - cardinality module | 330 - probability module |
| 340 - probability density function module | 350 - multi-object probability density function module |
| 360 - feature module | 370 - feature data |
| 410 - trajectory segment identification module | 420 - segment connectivity analysis module |
| 430 - curvature analysis module | 440 - parameters extraction module |
| 450 - topological association module | 501 - trajectory data point |
| 502 - trajectory tangential direction | 503 - trajectory normal direction |
| 505 - estimated center | 510 - cluster of estimated centers |

Referring now to FIG. 1, an illustration of an autonomous driving vehicle operating in a roundabout environment is shown. In this illustration, an autonomous driving vehicle (100) is operating in a roundabout traffic-circle environment. On the roundabout traffic circle there are remote vehicles (165), and the autonomous driving vehicle (100) is the host vehicle (160). Both remote vehicle (165) and host vehicle (160) are driving on the roundabout circular track (170).

The autonomous driving vehicle (100) is equipped with sensing means to detect objects in the roundabout traffic circle environment. The sensing means may include a radar sensor (131) and an optical sensor (132). The autonomous driving vehicle (100) is equipped with an autonomous driving system (110) to operate the vehicle in an autonomous driving mode. The autonomous driving system (110) may include a environment feature indication module (150), a sensor set (130), a roundabout characteristics recognition system (200) and a path planning and control module (120). The sensor set (130) may also further include a plurality of radar sensor (131) and a plurality of optical sensors (132).

The roundabout characteristics recognition system (200) may include a sensing and perception subsystem (210), a remote vehicle trajectory RFS module (220), a trajectory signal analysis module (230) and a roundabout characteristic recognition module (260). The sensing and perception subsystem (210) may include a sensing RFS module (212) and a target RFS module (214). The trajectory signal analysis module (230) may include a topological analysis module (240) and a geometric analysis module (250). The roundabout characteristic recognition module (260) may include a roundabout topological RFS module (262) and a roundabout geometric RFS module (264). The roundabout characteristic recognition module (260) sends roundabout topological data (270) and roundabout geometric data (280) via output ports (not shown) to the path planning and control module (120) which determines the path to follow ahead by the autonomous driving vehicle (100).

Figure 2:
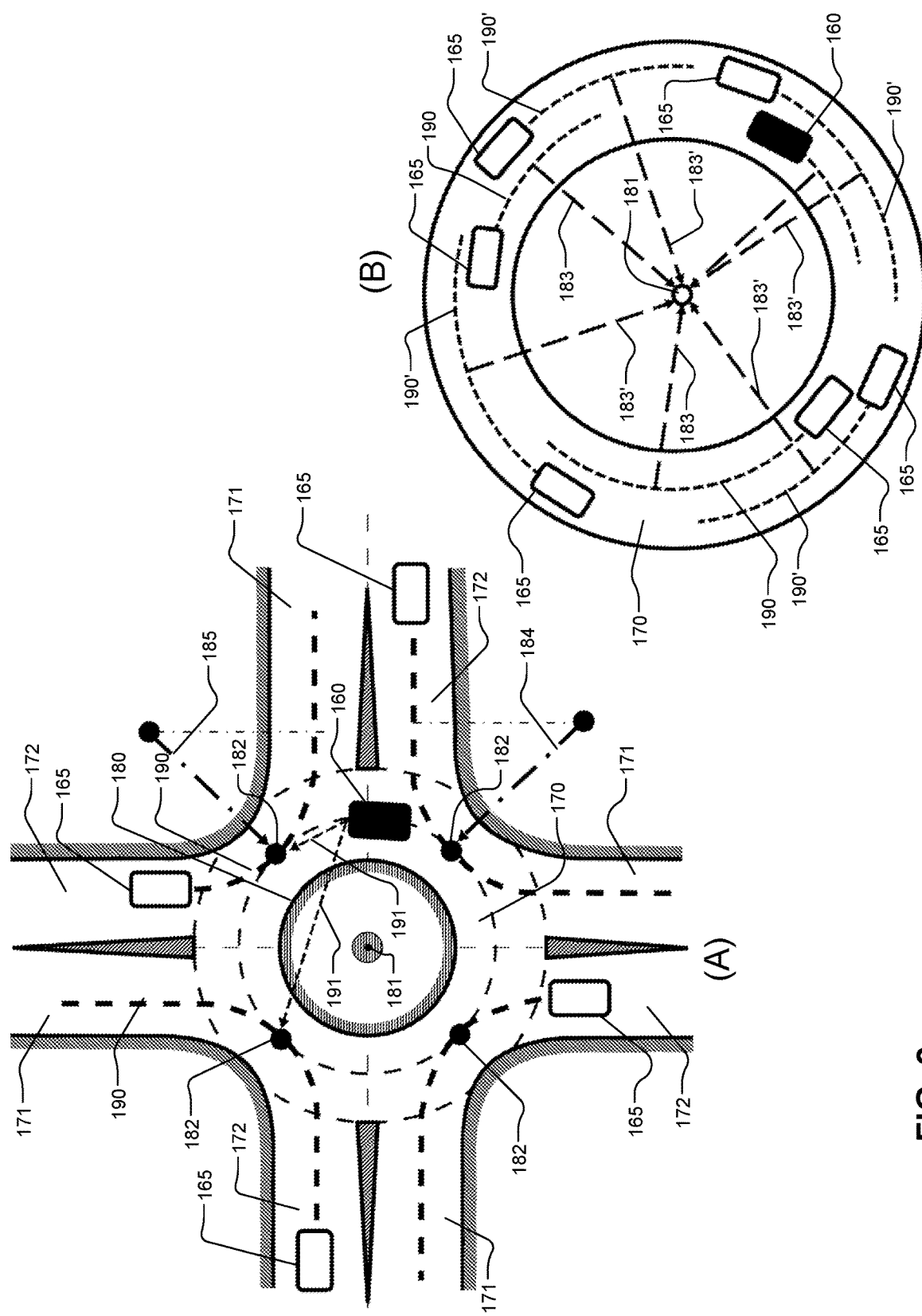
FIG. 2 shows an environment of a roundabout traffic circle.

Referring now to FIG. 2 an environment of a roundabout traffic circle (140) is shown. This environment contains various objects to be detected and recognized by the roundabout characteristics recognition system according to the present invention. FIG. 2 illustrates a host vehicle (160) driving on the roundabout circular track (170). Several remote vehicles (165) are also operating on this environment, these remote vehicles (165) may come into the circular track via the roundabout entrance path (171), travel over the roundabout circular track (170) and leave the circular track via roundabout exit path (172). While traveling through the roundabout entrance path, circular lane and exit path, the remote vehicle trajectory (190) of the remote vehicle (165) may be detected by the roundabout characteristics recognition system of present invention.

These trajectories may be utilized by the various modules of the roundabout characteristics recognition system to identify the various characteristics of the roundabout, for example, the roundabout entrance path (171), the roundabout exit path (172), the roundabout entrance radius (184), the roundabout exit radius (185) and the lane radius (183). These trajectories may further be analyzed to identify the roundabout center (181) of the roundabout central island (180), the lane radius (183) of the inner circle lane and the lane radius (183) of the outer circle lane.

The trajectories of the various remote vehicle (165) traveling on and through the roundabout environment may further be analyzed to determine the location of the diverging point (182) on the roundabout. These diverging points (182) are of significant importance for autonomous driving vehicle's path planning because each of these points is a crucial point to decide whether the vehicle should continue to follow the circular track or to diverge out of the circular track and take the exit path. The roundabout characteristics recognition system may also identify the position vector from the host vehicle to the detected diverging points (191).

Figure 3:
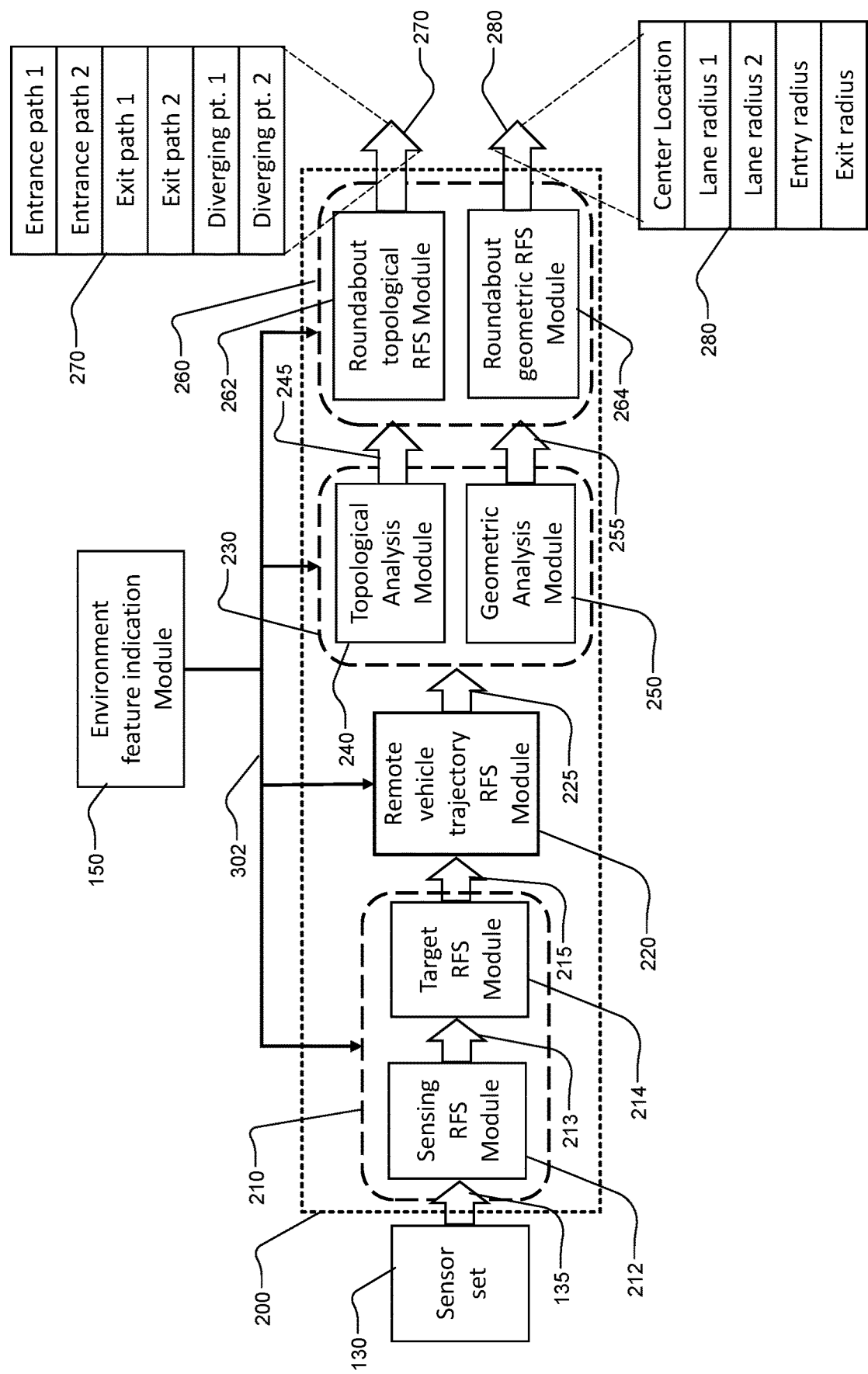
FIG. 3 shows a functional diagram of the roundabout characteristics recognition system according to the present invention.

Referring now to FIG. 3, a functional diagram of the roundabout characteristics recognition system (200) is shown. The roundabout characteristics recognition system (200) interacts with a environment feature indication module (150) and a sensor set (130). The roundabout characteristics recognition system (200) receives information of sensor raw data (135) from the sensor set (130), receives information of feature scope information (302) from the environment feature indication module (150) and generates information of roundabout topological data (270) and roundabout geometric data (280) to the downstream path planning and control module (120) as illustrated in FIG. 1.

The roundabout characteristics recognition system (200) may include a sensing and perception subsystem (210), a remote vehicle trajectory RFS module (220), a trajectory signal analysis module (230) and a roundabout characteristic recognition module (260). The sensing and perception subsystem (210) may include a sensing RFS module (212) and a target RFS module (214). The trajectory signal analysis module (230) may include a topological analysis module (240) and a geometric analysis module (250). The roundabout characteristic recognition module (260) may include a roundabout topological RFS module (262) and a roundabout geometric RFS module (264). The sensing and perception subsystem (210), remote vehicle trajectory RFS module (220), trajectory signal analysis module (230) and roundabout characteristic recognition module (260) are in electrical communication with the environment feature indication module (150) and receive feature scope information (302) from the environment feature indication module (150). The sensing and perception subsystem (210) is also in electrical communication with the sensor set (130) and receives sensor raw data (135) from the sensor set (130).

The sensing RFS module (212) generates processed sensor data (213) and is in electrical communication with the target RFS module (214). The sensing RFS module (212) sends the processed sensor data (213) to the target RFS module (214) via the electrical communication.

The target RFS module (214) generates roundabout remote target data (215) and is in electrical communication with the remote vehicle trajectory RFS module (220). The target RFS module (214) sends the roundabout remote target data (215) to the remote vehicle trajectory RFS module (220) via the electrical communication.

The remote vehicle trajectory RFS module (220) generates remote vehicle trajectory segments data (225) and is in electrical communication with the trajectory signal analysis module (230). The remote vehicle trajectory RFS module (220) sends the remote vehicle trajectory segments data (225) to the trajectory signal analysis module (230) via the electrical communication.

The topological analysis module (240) generates roundabout topological relevant data (245) and is in electrical communication with the roundabout characteristic recognition module (260). The topological analysis module (240) sends the roundabout topological relevant data (245) to the roundabout characteristic recognition module (260) via the electrical communication.

The geometric analysis module (250) generates roundabout geometric relevant data (255) and is in electrical communication with the roundabout characteristic recognition module (260). The geometric analysis module (250) sends the roundabout geometric relevant data (255) to the roundabout characteristic recognition module (260) via the electrical communication.

The roundabout topological RFS module (262) generates roundabout topological data (270) and sends the roundabout topological data (270) to path planning and control module (120) as shown in FIG. 1. The roundabout topological data (270) may include roundabout topological characteristics such as a first entrance path, a second entrance path, a first exit path, a second exit path, a first diverging point and a second diverging point.

The roundabout geometric RFS module (264) generates roundabout geometric data (280) and sends the roundabout geometric data (280) to path planning and control module (120) as shown in FIG. 1. The roundabout geometric data (280) may include roundabout geometric characteristics such as the roundabout central island center location, the radius of a first circular lane, the radius of a second circular lane, an entrance path radius and an exit path radius.

Figure 4:
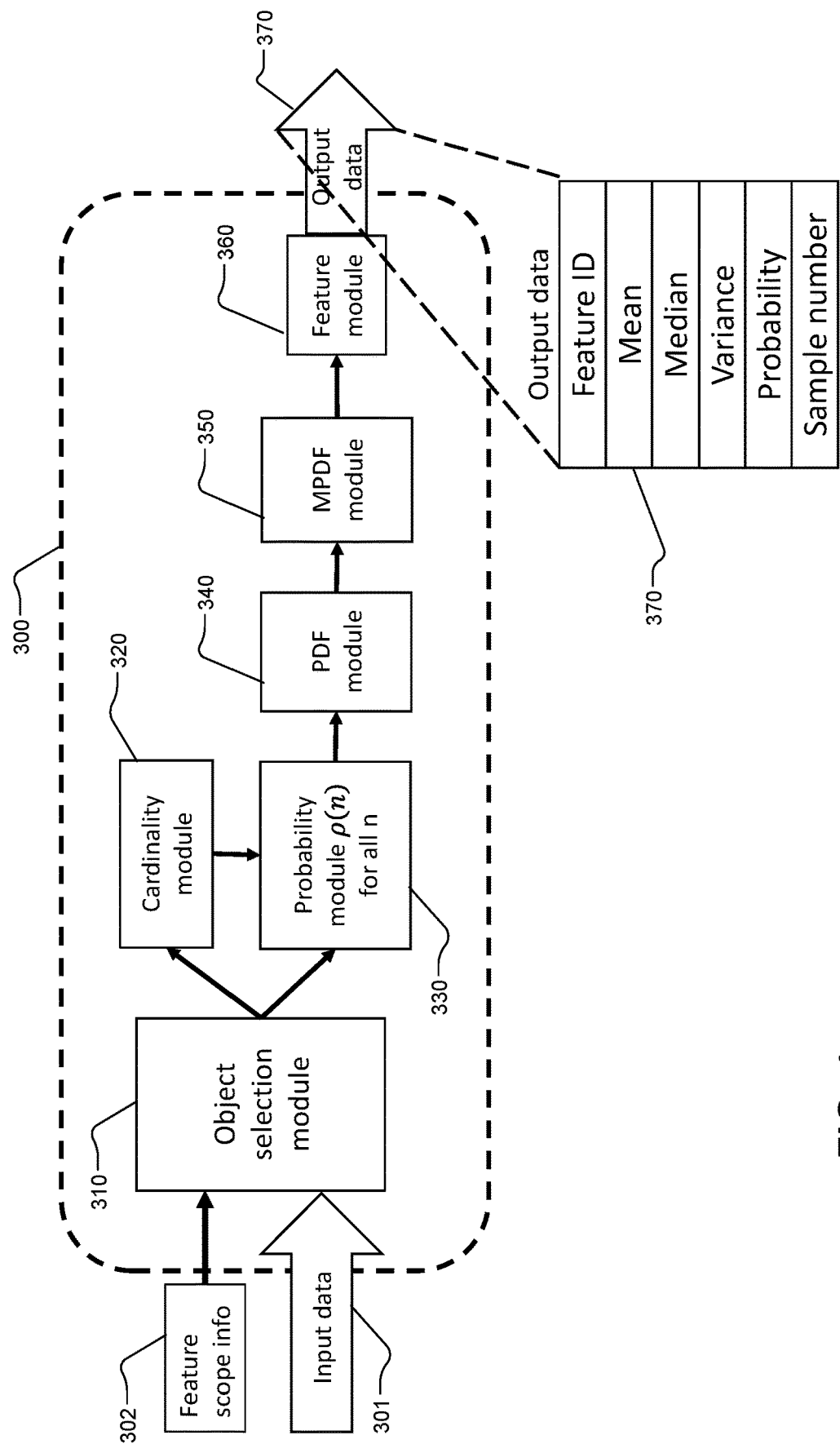
FIG. 4 shows a functional diagram of the Random Finite Set module according to the present invention.

Referring now to FIG. 4, a functional diagram of the Random Finite Set module (300) is shown. The Random Finite Set module (300) receives the various information of feature scope information (302) and raw information input data (301) for data processing and generates the various data of feature data (370) for the respective feature to be used in subsequent modules.

The Random Finite Set module (300) may include an object selection module (310), a cardinality module (320), a probability module (330), a probability density function module (340), a multi-object probability density function module (350) and a feature module (360). The object selection module (310) is in electrical communication with the cardinality module (320) and the probability module (330). The object selection module (310) receives the feature scope information (302) and the raw information input data (301) and selects qualified feature data to be processes based on the raw information input data and the feature scope information. The object selection module (310) generates processed object selection data to the cardinality module (320) and the probability module (330) via the electrical communication.

The cardinality module (320) is also in electrical communication with the probability module (330). The cardinality module (320) determines how many of the received feature data are to be processed and generates a number, N, representing the size of the qualified feature data according to the qualified feature data. The cardinality module (320) sends the number N to the probability module (330) via the electrical communication.

The probability module (330) receives the information of the size of the qualified feature data from the cardinality module (320). The probability module (330) determines the probability of the feature based on the feature data size number N and the qualified feature data. The probability module (330) is also in electrical communication with the probability density function module (340). The probability module (330) sends the probability of the qualified feature data to probability density function module (340) via the electrical communication.

The probability density function module (340) receives the probability of the qualified feature data from the probability module (330) and assesses the probability density function (PDF) based on the overall probability of possible qualified feature data of various data size determined by the probability module. The probability density function module (340) is also in electrical communication with the multi-object probability density function module (350). The probability density function module (340) sends the probability density function to the multi-object probability density function module (350) via the electrical communication.

The multi-object probability density function module (350) receives the probability density functions of the various objects from the probability density function module (340). The multi-object probability density function module (350) determines a multiplicity of probability density functions based on the probability density functions of the various qualified features. The multi-object probability density function module (350) is in electrical communication with the feature module (360). The multi-object probability density function module (350) sends the multiplicity of probability density functions to the feature module (360) via the electrical communication.

The feature module (360) receives the multiplicity of probability density functions from the multi-object probability density function module (350). The feature module (360) determines a plurality of statistical attributes of the various features and generates feature data (370) to be used by the various subsequent modules. The feature output data (370) may include a feature ID and the various statistical attributes of the feature including a mean value of the feature, a median value of the feature, a variance of the feature, a probability of the feature and a number representing the size of the samples used for processing these statistical attributes.

Figure 5:
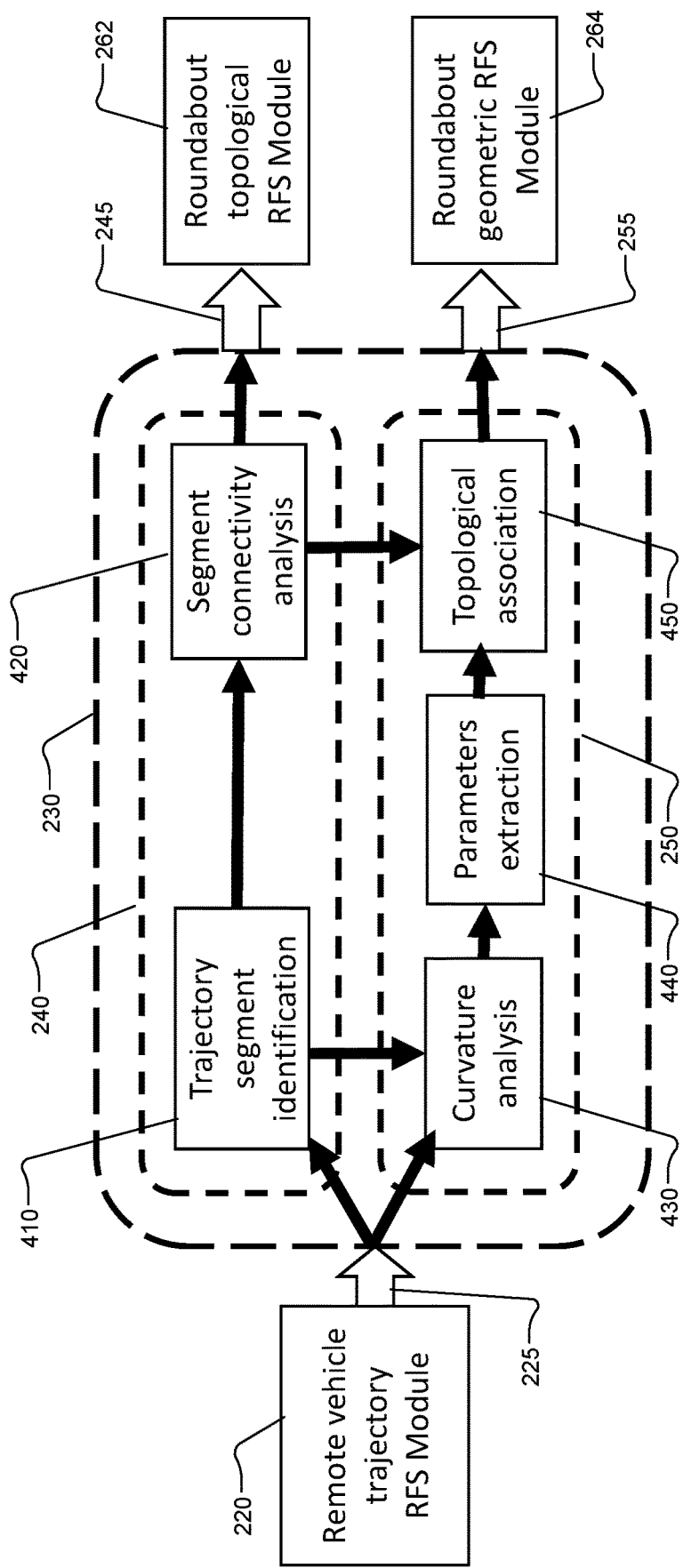
FIG. 5 shows a functional diagram of the trajectory signal analysis module according to the present invention.

Referring now to FIG. 5 a functional diagram of the trajectory signal analysis module (230) is shown. The trajectory signal analysis module (230) may include a topological analysis module (240) and a geometric analysis module (250). The topological analysis module (240) may include a trajectory segment identification module (410) and a segment connectivity analysis module (420). The geometric analysis module (250) may include a curvature analysis module (430), a parameters extraction module (440) and a topological association module (450). The topological analysis module (240) receives a plurality of remote vehicle trajectory segments data (225) and generates a plurality of roundabout topological relevant data (245). The geometric analysis module (250) receives a plurality of remote vehicle trajectory segments data (225) and generates the plurality of roundabout geometric relevant data (255).

The trajectory segment identification module (410) identifies a plurality of trajectory segments from the plurality of remote vehicle trajectory segments data (225) received from the remote vehicle trajectory RFS module (220). The segment connectivity analysis module (420) analyzes connectivity relationships among the plurality of trajectory segments and generates the plurality of the roundabout topological relevant data (245).

The curvature analysis module (430) analyzes curvature of the plurality of trajectory segments. The parameters extraction module (440) performs relevant mathematical operations and extracts a plurality of parameters of the trajectory segments. The topological association module (450) determines the association among the plurality of trajectory segment and generates the plurality of roundabout geometric relevant data (255).

The trajectory segment identification module (410) is in electrical communication with the segment connectivity analysis module (420) and the curvature analysis module (430). The curvature analysis module (430) is further in electrical communication with the parameters extraction module (440). The parameters extraction module (440) is further in electrical communication with the topological association module (450).

The segment connectivity analysis module (420) is further in electrical communication with the topological association module (450). The segment connectivity analysis module (420) is also in electrical communication with the roundabout topological RFS module (262) and sends the roundabout topological relevant data (245) to the roundabout topological RFS module (262) via the electrical communication.

The topological association module (450) associates the extracted geometric parameters with the relevant parts of the roundabout topology, for example, a number representing a curvature of an arc in the trajectory or a length representing a radius, and is further in electrical communication with the roundabout geometric RFS module (264) and sends the roundabout geometric relevant data (255) to the roundabout geometric RFS module (264) via the electric communication.

Figure 6:
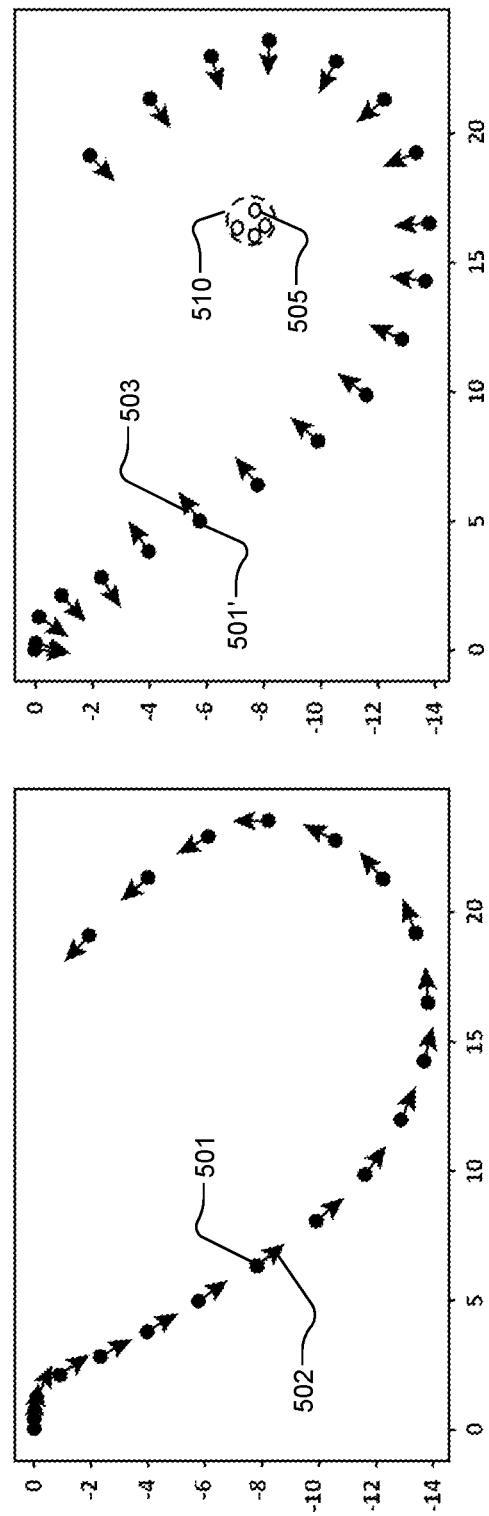
FIG. 6 illustrates a process of analyzing trajectory's characteristics to estimate the trajectory curvature and circle center of the trajectory curve according to the present invention.

In the trajectory signal analysis module (230) while the topological analysis module (240) analyzes connectivity of the trajectory segment to determine the topology of the roundabout environment, for example, identify the networking relationship among the circular track, the entrance path and the exit path, the geometric analysis module (250) perform numerical assessment of the relevant trajectory segment in order to extract key parameters of the roundabout characteristics. Among the various numerical attributes to be assessed in the various trajectory segments, estimation of a trajectory curvature and estimation of a curve center are the most important tasks to be performed. FIG. 6 illustrates the mathematical principle of such estimation processes.

As illustrated in FIG. 6(*a*), given a series of trajectory data points (501), the trajectory tangential direction (502) at each of the trajectory data point (501) is extracted. The curvature of the trajectory segment formed by these trajectory data points (501) can then be estimated based on the data of the trajectory tangential direction (502).

Likewise in FIG. 6(*b*), given a series of trajectory data points (501), the trajectory normal direction (503) at each of the trajectory data point (501) is extracted. The center of the curved trajectory segment (505) formed by these trajectory data points (501) can then be estimated based on the data of the trajectory normal direction (503). However, due to measurement uncertainty as well as the number of the trajectory data point (501) to be included in the analysis, there may be variations in the estimation of the estimated center (505). Therefore, a cluster of estimated centers (510) is recognized in the process of estimation of the curve center formed by the selected trajectory. The roundabout geometric RFS module (264) in FIG. 5 may then generate the information of the center location with the relevant statistical attributes such as the mean location of the cluster of estimated centers (510), the median location of the cluster of estimated centers (510), the variance of the estimated center (505), the probability representing the mean location and the median location of the cluster of estimated centers (510), as well as the number of data points in estimated center (505) that is used in the mathematical process as depicted in FIG. 4.

Similar to the process of identifying the roundabout circle center as depicted in this disclosure, all other feature extraction processes are performed in a similar way based on the RFS process principle using the Random Finite Set module (300) depicted in FIG. 4. In addition to the specific applicability of the illustrated RFS process in center-location estimation throughout the modules of the present invention, it shall also be understood that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A roundabout characteristics recognition system for an automatic driving vehicle equipped with a sensor system comprising plurality of sensors for sensing the driving environment wherein the vehicle is operating autonomously, a navigation system providing features information of the driving environment including a situation of driving in an environment of a roundabout and a path planning and control module operating the autonomous vehicle based on characteristics of the driving environment, said roundabout characteristics recognition system comprising:

a plurality of Random Finite Set (RFS) modules, each of which is characterized by receiving a feature scope information that describes a scope of an intended feature, of which a data to be processed, and raw information input data, from which the feature data is to be extracted, via a plurality of input ports and providing feature data as outputs via an output port, wherein each of the RFS module further comprising an object selection module that determines qualified feature data to be processes based on the raw information input data and the feature scope information, a cardinality module that determines a feature data size number representing the size of the qualified feature data according to the qualified feature data, a probability module that determines a probability of the feature based on the feature data size number and the qualified feature data, a probability density function module that assesses a probability density function based on the overall probability of possible qualified feature data of various data size determined by the probability module, a multi-object probability density function module that determines a plurality of probability density functions based on the probability density function of a plurality of the qualified feature, and a feature module that determines a plurality of statistical characteristics of the feature wherein the statistical characteristics comprising:

mean value of the qualified feature, median value of the qualified feature, variance value of the qualified feature, and probability of the qualified feature, wherein the object selection module is in electrical communication with the input ports for receiving data therefrom, and in electrical communication with the cardinality module and the probability module for sending data thereto, the cardinality module receives data from the object selection module, and is in electrical communication with the probability module for sending data thereto, the probability module receives data from the object selection module and the cardinality module, and is further in electrical communication with the probability density function module for sending data thereto, the probability density function module receives data from the probability module, and is further in electrical communication with the multi-object probability density function module for sending data thereto, the multi-object probability density function module receives data from the probability density function module, and is further in electrical communication with the feature module for sending data thereto, and the feature module is in electrical communication with the output port, and is characterized by generation of the statistical characteristics of the feature comprising a mean, a median, a variance, a probability and a sample number of the feature; and said plurality of the RFS modules comprising:
a sensing RFS module characterized by receiving raw data from a sensor set and generating processed sensor data,
a target RFS module characterized by receiving the processed sensor data and generating a plurality of roundabout remote target data,
a remote vehicle trajectory RFS module characterized by receiving the roundabout remote target data and generating a plurality of remote vehicle trajectory segments data,
a roundabout topological RFS module characterized by receiving a plurality of roundabout topological relevant data, and generating a plurality of roundabout topological data, and
a roundabout geometric RFS module characterized by receiving a plurality of roundabout geometric relevant data and generating a plurality of roundabout geometric data.

2. The roundabout characteristics recognition system as in claim 1 further comprising a trajectory signal analysis module, said trajectory signal analysis module further comprising:
a topological analysis module that receives the plurality of remote vehicle trajectory segments data and generates a plurality of roundabout topological relevant data, and
a geometric analysis module that receives the plurality of remote vehicle trajectory segments data and generates a plurality of roundabout geometric relevant data.

3. The roundabout characteristics recognition system as in claim 2 wherein the topological analysis module comprises:
a trajectory segment identification module that identifies a plurality of trajectory segments from a plurality of remote vehicle trajectory segments data,
a segment connectivity analysis module that analyzes connectivity relationships among the plurality of trajectory segments and generates the plurality of the roundabout topological relevant data;
and wherein the geometric analysis module comprises:
a curvature analysis module that analyzes curvature of the plurality of trajectory segments,
a parameters extraction module that extracts a plurality of parameters of the trajectory segments, and
a topological association module that determines the association among the plurality of trajectory segment and generates the plurality of roundabout geometric relevant data;
wherein
the trajectory segment identification module is in electrical communication with the segment connectivity analysis module and the curvature analysis module,
the curvature analysis module is further in electrical communication with the parameters extraction module,
the parameters extraction module is further in electrical communication with the topological association module,
the segment connectivity analysis module is further in electrical communication with the topological association module, said segment connectivity analysis module is also in electrical communication with the roundabout topological RFS module and sends the roundabout topological relevant data to the roundabout topological RFS module via the electrical communication, and
the topological association module is further in electrical communication with the roundabout geometric RFS module and sends the roundabout geometric relevant data to the roundabout geometric RFS module via the electric communication.

4. An autonomous driving vehicle equipped with a sensor system comprising plurality of sensors for sensing the driving environment wherein the vehicle is operating autonomously, a navigation system providing features information of the driving environment including a situation of driving in an environment of a roundabout and a path planning and control module operating the autonomous vehicle based on characteristics of the driving environment, said autonomous driving vehicle further comprising a roundabout characteristics recognition system comprising:
a plurality of Random Finite Set (RFS) modules, each of which is characterized by receiving a feature scope information that describes a scope of an intended feature, of which a data to be processed, and raw information input data, from which the feature data is to be extracted, via a plurality of input ports and providing feature data as outputs via an output port, wherein each of the RFS module further comprising
an object selection module that determines qualified feature data to be processes based on the raw information input data and the feature scope information,
a cardinality module that determines a feature data size number representing the size of the qualified feature data according to the qualified feature data,
a probability module that determines a probability of the feature based on the feature data size number and the qualified feature data,
a probability density function module that assesses a probability density function based on the overall probability of possible qualified feature data of various data size determined by the probability module,
a multi-object probability density function module that determines a plurality of probability density functions based on the probability density function of a plurality of the qualified feature, and
a feature module that determines a plurality of statistical characteristics of the feature wherein the statistical characteristics comprising:
mean value of the qualified feature,
median value of the qualified feature,
variance value of the qualified feature, and
probability of the qualified feature,
wherein the object selection module is in electrical communication with the input ports for receiving data therefrom, and in electrical communication with the cardinality module and the probability module for sending data thereto,
the cardinality module receives data from the object selection module, and is in electrical communication with the probability module for sending data thereto,
the probability module receives data from the object selection module and the cardinality module, and is further in electrical communication with the probability density function module for sending data thereto,
the probability density function module receives data from the probability module, and is further in electrical communication with the multi-object probability density function module for sending data thereto, the multi-object probability density function module receives data from the probability density function module, and is further in electrical communication with the feature module for sending data thereto, and the feature module is in electrical communication with the output port, and is characterized by generation of the statistical characteristics of the feature comprising a mean, a median, a variance, a probability and a sample number of the feature; and said plurality of the RFS modules comprising:

a sensing RFS module characterized by receiving raw data from a sensor set and generating processed sensor data, a target RFS module characterized by receiving the processed sensor data and generating a plurality of roundabout remote target data, a remote vehicle trajectory RFS module characterized by receiving the roundabout remote target data and generating a plurality of remote vehicle trajectory segments data, a roundabout topological RFS module characterized by receiving a plurality of roundabout topological relevant data, and generating a plurality of roundabout topological data, and a roundabout geometric RFS module characterized by receiving a plurality of roundabout geometric relevant data and generating a plurality of roundabout geometric data.

5. The autonomous driving vehicle as in claim 4 wherein the roundabout characteristics recognition system further comprising a trajectory signal analysis module, said trajectory signal analysis module further comprising:

a topological analysis module that receives the plurality of remote vehicle trajectory segments data and generates the plurality of roundabout topological relevant data, and a geometric analysis module that receives a plurality of remote vehicle trajectory segments data and generates the plurality of roundabout geometric relevant data.

6. The autonomous driving vehicle as in claim 5 wherein the topological analysis module comprises:

a trajectory segment identification module that identifies a plurality of trajectory segments from a plurality of remote vehicle trajectory segments data, a segment connectivity analysis module that analyzes connectivity relationships among the plurality of trajectory segments and generates the plurality of the roundabout topological relevant data, and wherein the geometric analysis module comprising:

a curvature analysis module that analyzes curvature of the plurality of trajectory segments, a parameters extraction module that extract a plurality of parameters of the trajectory segments, and a topological association module that determines the association among the plurality of trajectory segment and generates the plurality of roundabout geometric relevant data;

wherein the trajectory segment identification module is in electrical communication with the segment connectivity analysis module and the curvature analysis module, the curvature analysis module is further in electrical communication with the parameters extraction module, the parameters extraction module is further in electrical communication with the topological association module, and the segment connectivity analysis module is further in electrical communication with the topological association module, said segment connectivity analysis module is also in electrical communication with the roundabout topological RFS module and sends the roundabout topological relevant data to the roundabout topological RFS module via the electrical communication, and the topological association module is further in electrical communication with the roundabout geometric RFS module and sends the roundabout geometric relevant data to the roundabout geometric RFS module via the electric communication.

\* \* \* \* \*